INVENTOR
NILS O. ROSAEN

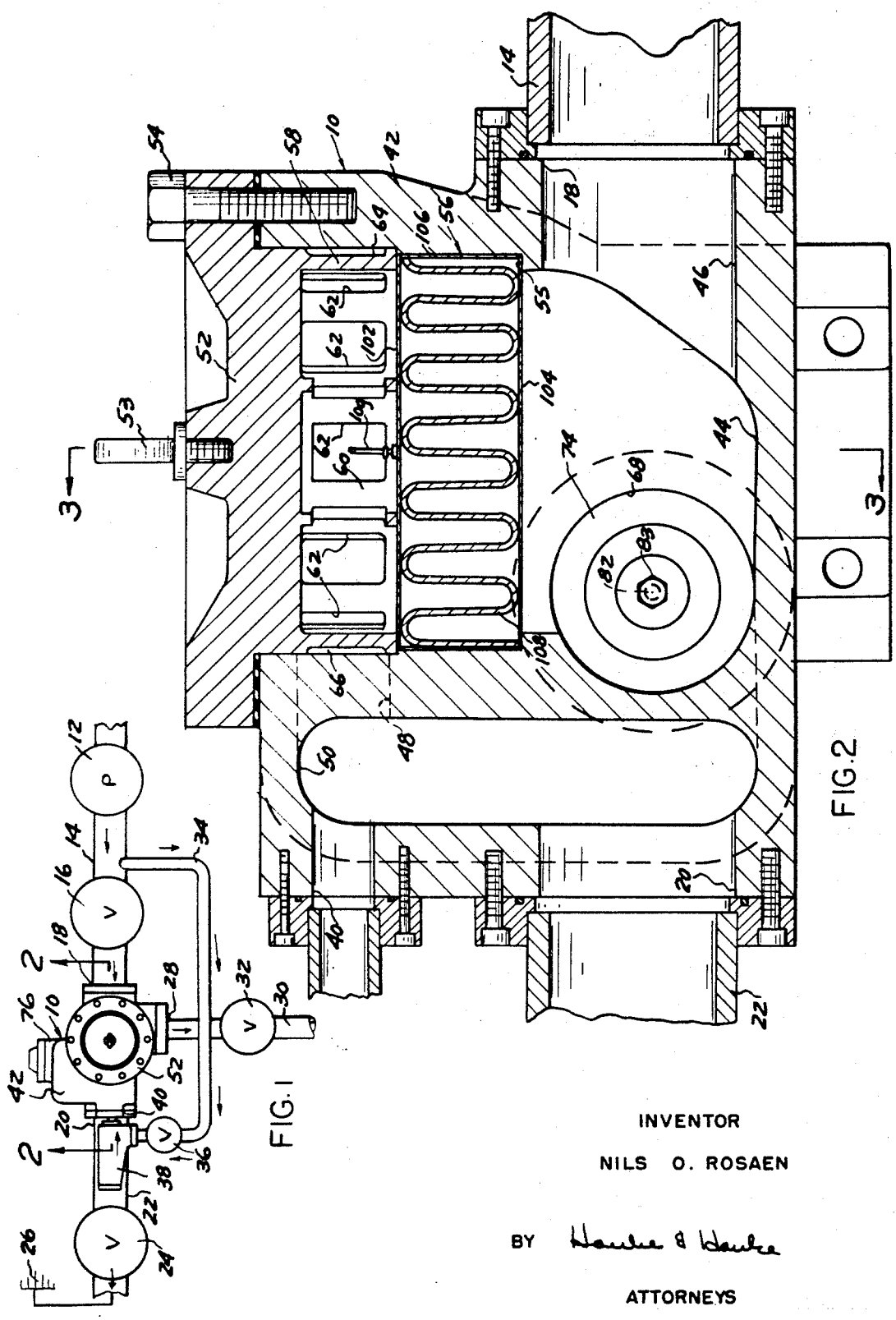

United States Patent Office

3,438,498
Patented Apr. 15, 1969

3,438,498
HIGH PRESSURE FILTER DEVICE
Nils O. Rosaen, Bloomfield Hills, Mich., assignor, by mesne assignments, to Universal Filters, Inc., Hazel Park, Mich., a corporation of Michigan
Filed Nov. 26, 1965, Ser. No. 509,792
Int. Cl. B01b 35/00
U.S. Cl. 210—90                                    3 Claims

ABSTRACT OF THE DISCLOSURE

A filter device for a high pressure fluid system including a housing provided with a chamber and a filter element dividing the chamber into an outlet portion and an inlet portion with the inlet portion being of a greater volume than the outlet portion and with the filtering surfaces of the filter element being of a greater area than the cross sectional area of the inlet and outlet. Means are provided for indicating the clogged condition of the filter element and for back flushing the filter element when it becomes unduly clogged.

---

The present invention relates to high pressure fluid systems and more particularly to a new filter device for such fluid systems.

The present invention has special application in high pressure descaling equipment for hot rolling mills and the like although as will become more apparent as the description proceeds, it can be used in other high pressure fluid systems as well. Descaling equipment is used by the steel industry to remove the layer of iron oxide crust or scale which forms on the slab of steel during the reheating and rolling operations. Non-effective removal of this scale results in poor product quality due to the scale becoming embedded into the steel surface during reduction operations and thereby making the steel unsuitable for prime finished products.

The descaling equipment heretofore used has generally comprised a high pressure pumping system for delivering water to a bank of nozzles positioned over the metal to be descaled. Strainers are provided on the suction side of the high pressure pumps to remove large objects such as fish, rocks, wood, etc., to protect the pumps as well as the nozzles. On the pressure side of the pumps, at each header going to a mill stand, a cartridge or element is carried to remove the fine particles that pass through the pumps and to remove the pipe scale that exists in water piping systems. The cartridges or elements are generally constructed of a series of slotted or grooved rings placed around a back-up cylinder and held together by a bolt or cap screw to form a substantially cylindrical filter element. The effective area of such cartridges is usually about the same as the open area of the piping used because to increase the filter area of such cartridges requires a housing of an unduly large size. The flow velocity through the filter element then is about the same as the flow velocity through the pipe and as such systems utilize high pressures and velocities the erosion factor in such filter elements is very high. As the element erodes, the slots or grooves open up, letting larger and larger particles through and consequently causing scoring or plugging of the nozzles. The nozzles are quite expensive and if they must be replaced because of scoring or to be cleaned, the cost of replacement plus the cost of shutting down operations to permit the replacement or cleaning can approach quite high figures.

When the element becomes clogged there is usually no warning. The pressure drop can become so high that effective descaling becomes impossible, and the strainer element can collapse or the end cover might blow off. Pressure gages placed on each side of the strainer are sometimes used to give an indication that the elements are becoming clogged but these are unreliable due to their tendency to become uncalibrated and also due to the fact that what they are indicating depends upon the individual operator's interpretation of their meaning. Pressure differential switches are sometimes used but these are unreliable due to line shock or vibration which may be produced in the system at any time and which would effect the actuation of such switches.

The present invention overcomes these difficulties by providing a new filter device which includes a positive means of indicating when the filter element is becoming clogged. The indicator is not affected by line shock or vibration and since it gives an indication over the full range of the degree of clogging, it permits the cleaning to be scheduled in advance thus taking advantage of normal production delays such as roll change, size change, etc. This avoids costly down time for cleaning or replacement of the filter element. If the filter is not changed or cleaned an automatic proportional filtering position is attained by the filter device. This position provides proportional or complete bypass of the filter element to maintain full flow and substantially full line pressure even when the element is completely clogged. Thus the descaling system can be operated even when the filter element is completely clogged.

The filter device permits cleaning of the element in either of two ways. If time permits, the cover can be removed to remove the element for cleaning or replacement. The other method is by back flushing. The device is provided with drain and back-flush connections which permit the filter element to be cleaned without removal from the filter device.

Probably, however, the most important feature of the filter device resides in a construction which produces a low flow velocity and pressure drop across the filter element. This is accomplished by an increase in the effective filtering area of the filter device without a corresponding increase in the size of the filter housing and this is made possible by a new construction for the filter element as will become more apparent as the description proceeds.

It is an object then of the present invention to reduce the shut down time for high pressure fluid descaling systems and the like by providing a new filter device for such systems having a filter element and means accurately indicating the degree of clogging of the filter element.

It is still another object of the present invention to improve the operation of high pressure fluid descaling systems and the like by providing a new filter device for such systems constructed to produce a greater filtering area for a given size housing than heretofore possible.

It is yet another object of the present invention to facilitate the cleaning of filter elements for high pressure fluid descaling systems and the like by providing a filter device for such systems having connections for back-flushing and cleaning the filter device in place.

It is still another object of the present invention to maintain a predetermined high pressure at the nozzles of high pressure fluid descaling systems and the like by providing a filter device for such systems operable to automatically proportionately bypass the filter element as the filter element becomes clogged.

Still further objects and advantages of the present invention will become readily apparent to one skilled in the art upon reference to the following description. The description makes reference to the following drawings in which like reference characters refer to like parts throughout the several views and in which:

FIG. 1 is an elevational view of a portion of a preferred system utilizing the filter device of the present invention and with portions of the system illustrated diagrammatically for purposes of clarity.

FIG 2 is a cross sectional view taken substantially on line 2—2 of FIG. 1 and enlarged somewhat for purposes of clarity.

Figure 3:
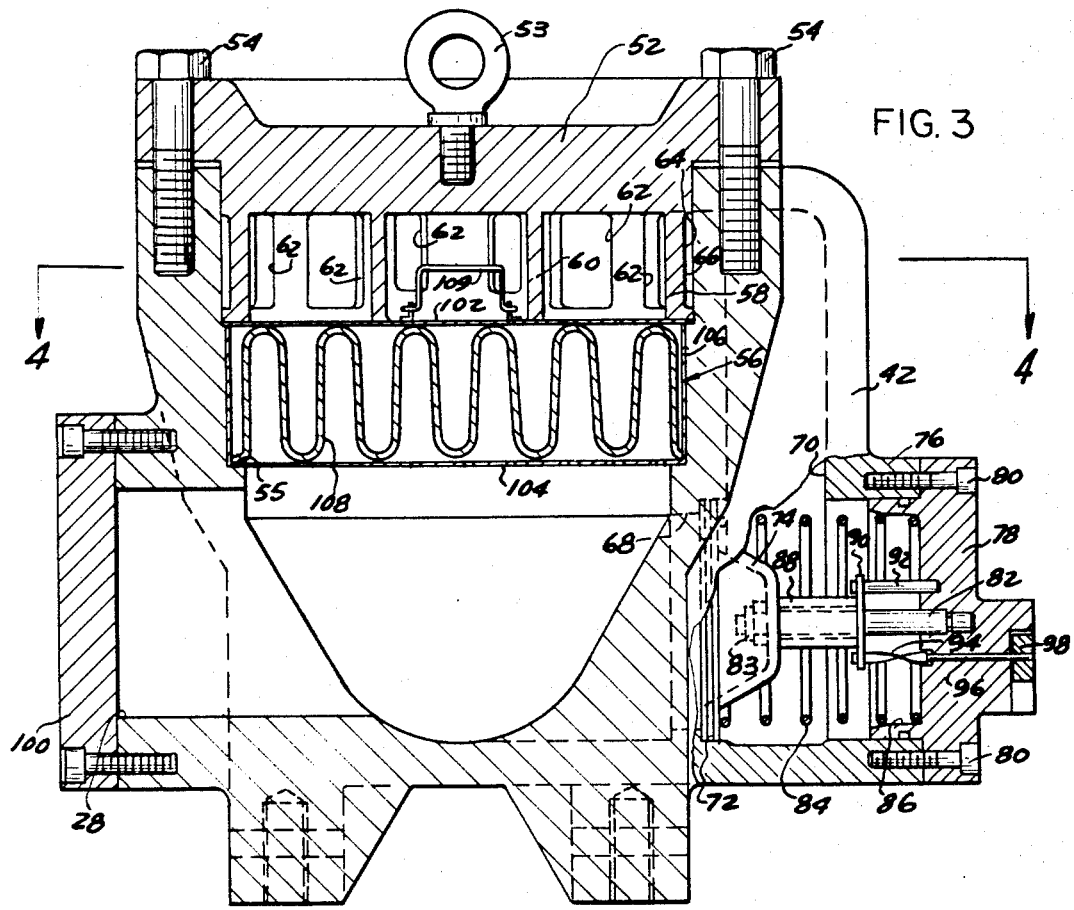
FIG. 3 is a cross sectional view taken substantially on line 3—3 of FIG. 2 with portions broken away for purposes of clarity.

Now referring to the drawings for a more detailed description of the present invention, a portion of a preferred fluid system utilizing a preferred filter device 10 is illustrated in FIG. 1 as comprising a high pressure pump 12 having its discharge side connected through a conduit 14 and a valve 16 to an inlet 18 provided in the filter device 10. The filter device 10 is provided with an outlet 20 connected through a conduit 22 and a valve 24 to the nozzles 26 of the descaling system. The filter device 10 is also provided with a drain outlet 28 connected by conduit 30 and through a valve 32 to a sewer or sluiceway (not shown). A conduit 34 is connected to the conduit 14 intermediate the pump 12 and the valve 16. The opposite end of the conduit 34 is connected through a valve 36 and an auxiliary filter device 38 to a back flush inlet 40 in the filter device 10.

Figure 4:
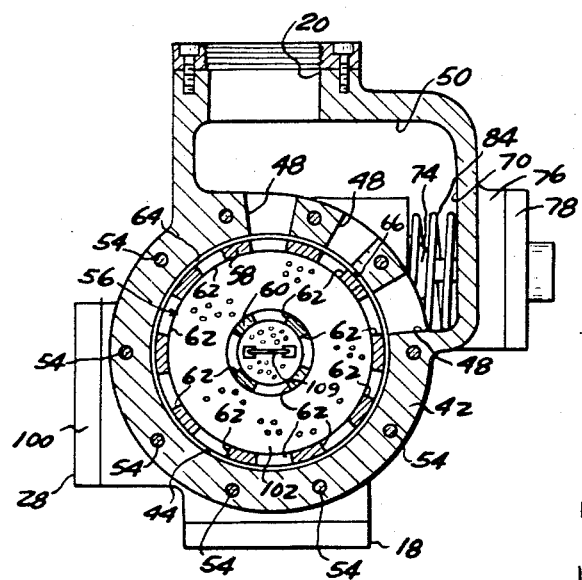
FIG. 4 is a cross sectional view taken substantially on line 4—4 of FIG. 3 and reduced somewhat.

Now referring to FIGS. 2–4, the preferred filter device 10 is therein illustrated as comprising a housing 42 interiorly cored to define an inner chamber 44. The inlet 18 is connected with one end of the chamber 44 by a radial inlet passage 46 and the outlet 20 is connected with the opposite end of the chamber 44 by means of a plurality of outlet passages 48 and an outlet chamber 50 as can best be seen in FIG. 2.

The end of the chamber 44 is open and is preferably closed by a removable cover 52 mounted to the housing 42 by a plurality of bolts 54. The cover 52 is preferably provided with a handle in the form of an eye member 53 to aid in removal. The chamber 44, at least the upper portion thereof adjacent the cover 52 is preferably cylindrical and the inner surface of the housing 42 is formed with a radially inwardly extending shoulder 55 to provide the seat for receiving a flat cylindrical filter element 56 as can best be seen in FIGS. 2–4. The cover 52 is provided with an outer cylindrical portion 58 extending into the chamber 44 and axially aligned therewith and with the filter element 56 and a similarly extending inner cylindrical portion 60. The cylindrical portions 58 and 60 are dimensioned to extend either into engagement with or closely adjacent the filter element 56 to position the filter element 56 in place against the shoulder 55 and to provide support for the filter element 56 when high pressure fluid is directed through the filter device. The cylindrical portions 58 and 60 are each provided with a plurality of annularly spaced openings 62 which permit fluid to pass from the outlet side of the filter element 56 to the outlet passages 48. To insure the usefulness of all of the openings 62 the cylindrical portion 58 is provided with an annular recess 64 adjacent the inner wall of the housing 42 to form an annular passage 66 connecting the openings 62 with the outlet passages 48.

The chamber 44 is relatively large and the filter element 56 is disposed close to the outlet side thereof to leave a large open area of the chamber 44 on the inlet side of the filter element 56. As can best be seen in FIGS. 2–3 a bypass passage 68 is formed in the housing 42 in registry with the chamber 44 on the inlet side of the filter element 56. A bypass chamber 70 formed in the housing 42 connects the passage 68 with the outlet chamber 50 as can best be seen in FIG. 4. An annular valve seat 72 is formed in the housing 42 at the point of connection between the bypass passage 68 and the bypass chamber 70 and an inverted cup-shaped valve member 74 is carried to be normally positioned in the valve seat 72.

The means for mounting the valve member 74 preferably comprises an open boss portion 76 formed in the housing 42 and opening radially to the bypass chamber 70 in axial alignment with the bypass passage 68. The open end of the boss portion 76 is closed by a cap 78 mounted to the housing 42 by screws 80. A rod 82 is carried by the cap 78 and provides the means for axially slidably mounting the valve member 74 to the cap 78 in a position to move axially toward and away from the valve seat 72. A nut 83 carried on the threaded free end of the rod 82 prevents separation of the valve member 74 from the cap 78. A spring 84 having one end seated in an annular recess 86 formed in the cap 78 and the opposite end bearing against the valve member 74 urges the valve member 74 into the seat 72 to normally close fluid flow through the bypass passage 68.

The valve member 74 includes an elongated portion 88 encompassing the rod 82 and formed at the end nearest the cap 78 with a radially outwardly extending flange portion 90. The flange portion 90 is provided with a pair of oppositely positioned peripheral slots (not shown) one of which receives a guide pin 92 carried by the cap 78 to guide axial movement of the valve member 74 to thereby aid in preventing the valve member 74 from malfunctioning due to it becoming wedged on the rod 82. The other slot is preferably rectangular in shape and receives an actuator element 94. The actuator element 94 is preferably in the form of a flat strip of material having a uniform twist about its longitudinal axis from end to end and is received axially in the rectangular slot formed in the flange portion 90 so that axial movement of the valve member 74 causes the walls of the flange portion 90 forming the slot to engage the sides of the actuator element 94 and to cause it to rotate in direct relationship with the axial movement of the valve member 74.

The opposite end of the actuator element 94 is joined axially with a shaft 96 rotatably carried by the cap 78 and extending therethrough to provide the means for mounting a pointer element 98 on the exterior surface of the cap 78. The pointer element 98 is rotatable with the actuator element 94 and the shaft 96 and points to suitable indicia (not shown) provided on the exterior surface of the cap 78.

The drain outlet 28 is shown in FIGS. 3 and 4 as being closed by a removable member 100 but as can best be seen in FIG. 3 the outlet 28 is connected with the chamber 44 on the inlet side of the filter element 56. As can best be seen in FIG. 2 the back flush inlet 40 is connected with the outlet chamber 50.

The filter element 56 preferably comprises upper and lower circular flat and perforated members 102 and 104 respectively mounted to a cylindrical outer member 106 of relatively short axial length. The interior of the element 56 is filled with a flat filtering material 108 pleated and joined to the inner wall of the outer cylindrical member 106 to form a plurality of chordially extending parallel pleats. The upper member 102 is preferably provided with a handle 109 to aid in removing the filter element 56 from the housing 42.

In normal operation the fluid, which in the descaling systems for which the present device is intended will be water, is pumped at a relatively high pressure by the pump 12 through the conduit 14 and into the chamber 44 through the inlet 18 of the filter device 10. The water will then pass axially through the filter element 56 and through the outlet chamber 50 to the outlet 20 to be delivered to the nozzles 26 by the conduit 22. As the filter element 56 begins to clog, an increase in the pressure differential across the element 56 will be produced. This increase in pressure differential between the inlet side and the outlet side of the filter element 56 will cause the valve member 74 to move axially away from the valve seat 72. This movement of course will be transmitted to the pointer element 98 and with proper indicia on the exterior surface of the cap 78 an indication of the degree of clogging of the filter element 56 over the full range of clogging can be accurately indicated. This permits the operator of the system to know at any given time the present degree of clogging of the element and also provides a forewarning as to when the element will need cleaning or replacement so that this operation can be scheduled in advance and performed during a normal down time for the production apparatus for which the descaling system is intended to service.

Descaling systems require that the relatively high pressure be maintained at the nozzles and therefore the valve member 74 is designed to proportionately open a path directly from the inlet 18 to the outlet 20 bypassing the filter element 56 when a predetermined pressure differential is produced across the element 56. The permissible pressure drop is determined by the rate of the spring 84. The valve seat 72 is elongated somewhat axially as shown in FIG. 3 to permit initial movement of the valve member 74 to produce movement of the pointer element 98 before opening the bypass path. The bypass path will open proportionately to the degree of clogging to maintain a substantially uniform pressure at the nozzles 26.

When it is desired to clean the element 56 this can be accomplished by removing the cap member 54 to remove the element 56 for cleaning or replacement or it can be accomplished by back flushing water through the element 56 while the element remains in place. To clean the element 56 in place, the normally opened valves 16 and 24 are closed and the normally closed valves 32 and 36 are opened. Opening the valve 36 directs high pressure water from the pump 12 through the back flush inlet 40 and into the outlet chamber 50. The auxiliary filter 38 may be provided to clean the water being used to clean the element 56. The water will flow from the outlet chamber 50 and through the filter element 56 in a reverse direction and will therefore carry off foreign matter collected on the inlet side of the filter element 56 through the outlet 28 to a suitable drain or sewer.

Probably the most important advantage of the filter device of the present invention over filter devices heretofore used in descaling systems resides in the inner construction of the housing 42 in combination with the particular construction of the filter element 56. By abandoning the conventional cylindrical type filter element wherein the fluid flows radially through the element and by providing a relatively large chamber on the inlet side of the filter element, it has been possible to substantially increase the filtering area which can be provided in a given size housing. It is important in such systems to provide a filter device in which the filter area is equal to or larger than the cross sectional area of the pipe being used for the system. Otherwise the flow velocity through the element is so great as to produce a substantial erosion problem. Further the lower the flow velocity across the filter element, the more efficient the filter element becomes. With systems utilizing large size pipes such as descaling systems about the most that could heretofore be hoped for was a 1:1 ratio between pipe size and filter area for any attempts to increase the ratio by increasing the filtering area of cylindrical type filter elements required too large an increase in housing size. This is occasioned by the fact that to increase the flow capacity of a cylindrical filter element, not only is it necessary to increase the interior passage forward of the element, but the spacing between the outer surface of the element and the inner wall of the housing must also be increased by a like amount.

In the device of the present invention the filtering area produced by the filter element 56 can be provided several times that of the pipe size without a disproportional increase in the size of the housing 42.

It is apparent that although I have described but one embodiment of my invention many changes and modifications can be made therein without departing from the spirit of the invention as expressed by the scope of the appended claims.

I claim:
1. In a high pressure fluid system a filter device comprising:
   a housing having a chamber and an inlet and an outlet open to opposite ends of said chamber;
   said housing being formed with an opening to said chamber and the inner wall of said housing forming said chamber formed with an inwardly extending shoulder portion spaced inwardly from and facing said opening;
   a flat filter element insertable into said chamber through said opening and being engagable with said shoulder portion, said filter element having one surface exposed to said inlet and an opposite surface exposed to said outlet so that said filter element divides said chamber into an inlet portion connected with said inlet and an outlet portion connected with said outlet;
   the area of said surfaces exceeding the cross sectional area of said inlet and of said outlet and said inlet portion of said chamber being of greater volume than said outlet portion;
   a cap mmeber removably secured to said housing and including a portion extending into said chamber and engaging with said filter element to maintain said filter element in place intermediate said cap member portion and said shoulder portion;
   said housing further having a backflush inlet connected with said chamber on the outlet side of said filter element and a drain outlet connecting to said chamber on the inlet side of said filter element; and
   said housing having a second opening spaced from and formed on an axis substantially normal to the axis of said first mentioned opening, indicating means carried in said second opening and including a pressure responsive movable member having one side exposed to pressure on the inlet side of the filter element and an opposite side exposed to pressure on the outlet side of the filter element, and means operably connected to said pressure responsive member to indicate the position thereof exteriorly of said housing whereby to indicate the condition of said filter element.

2. The filter device as defined in claim 1 and including
   (a) a bypass passage provided in said housing connecting said inlet and said outlet and bypassing said filter element, and
   (b) said pressure responsive member comprising a normally closed valve member carried in said bypass passage and normally closing fluid flow therethrough and being pressure responsive to open a bypass path around said filter element upon a predetermined increase in the pressure differential across said filter element.

3. The filter device as defined in claim 1 and in which said filter element further comprises
   (a) said surfaces being formed by a pair of circular perforated members,
   (b) a cylindrical member of relatively short axial length disposed intermediate and connecting said perforated members, and (c) a flat piece of filtering material joined at opposite sides to said cylindrical member and being folded to form a plurality of parallel pleats.

References Cited

UNITED STATES PATENTS

| | | | |
|---|---|---|---|
| 536,503 | 3/1895 | Albach | 210—90 X |
| 2,874,846 | 2/1959 | Herster | 210—451 X |
| 2,939,582 | 6/1960 | Giles | 210—130 X |
| 3,029,836 | 4/1962 | Gruner | 210—90 X |
| 3,080,058 | 3/1963 | Rosaen | 210—90 |
| 3,080,058 | 3/1963 | Rosaen | 210—90 |
| 3,358,843 | 12/1967 | Bourdale | 210—493 X |

FOREIGN PATENTS 642,748  6/1946  Great Britain.

SAMIH N. ZAHARNA, *Primary Examiner.*

U.S. Cl. X.R.

210—411